United States Patent [19]

Schwindt

[11] 4,010,563
[45] Mar. 8, 1977

[54] ANIMAL IDENTIFICATION TAG
[75] Inventor: Jackson T. Schwindt, Cody, Wyo.
[73] Assignee: Y-Tex Corporation, Cody, Wyo.
[22] Filed: Feb. 6, 1975
[21] Appl. No.: 547,478

Related U.S. Application Data

[63] Continuation-in-part of Ser. No. 459,292, April 9, 1974, abandoned.
[52] U.S. Cl. .................................................. 40/301
[51] Int. Cl.² .......................................... B09F 3/00
[58] Field of Search ............. 40/300, 301, 302, 22; 24/73 P, 73 PF

[56] References Cited
UNITED STATES PATENTS 3,896,577  7/1975  Hayes .................................. 40/301

Primary Examiner—Russell R. Kinsey
Assistant Examiner—John H. Wolff
Attorney, Agent, or Firm—Hume, Clement, Brinks, Willian, Olds & Cook, Ltd.

[57] ABSTRACT

The invention provides an improved animal identification tag for attachment to the ear of an animal, which stands up when attached to the ear to provide for improved readability. The tag is of one-piece construction, and is easily inserted. The tag has a flat information-carrying portion having a surface on which indicia may be placed, and a pin extending outwardly from the edge of the information-carrying portion in a direction generally parallel to the surface. The end of the pin has laterally extending, resilient, flexible prongs forming a spear-shaped portion which passes through the ear of the animal and retains the tag in the ear. To retain the tag in an upright position, the tag is provided with a pair of flexible, resilient support members extending outwardly from the information-carrying portion adjacent to the shaft. These support members are positioned to contact the surface of the ear of an animal when the prongs and end of the shaft are passed through the ear.

37 Claims, 7 Drawing Figures

FIG. 1
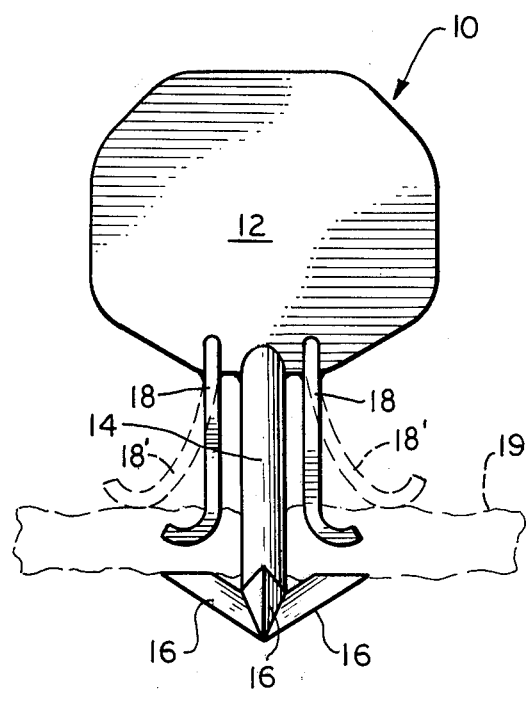
FIG. 2
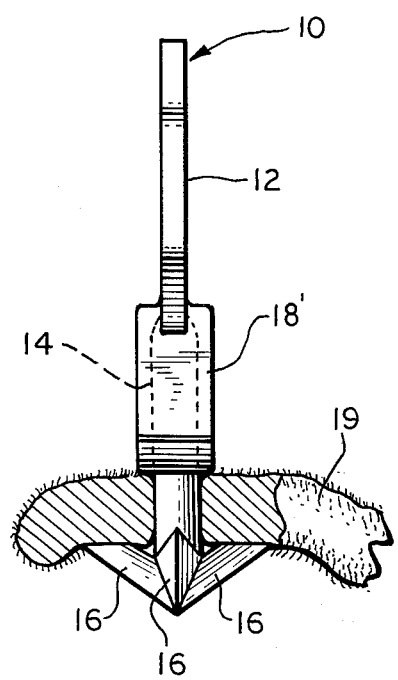
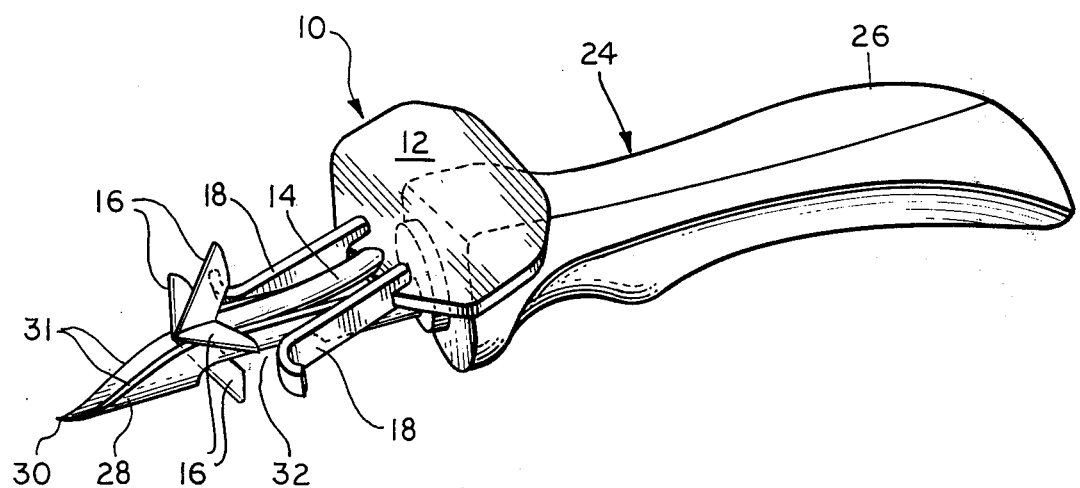
FIG. 3

ANIMAL IDENTIFICATION TAG

This is a continuation-in-part of my copening application, Ser. No. 459,292, filed Apr. 9, 1974 now abandoned.

The present invention relates to an improved animal identification tag, and more specifically to an improved tag which, when attached to the ear of an animal, stands up in a position generally perpendicular to the surface of the ear.

Animal identification tags are highly useful for a number of purposes. Such tags can be employed to identify animals along with their breed lines, weight, carcass characteristics, physical condition, etc. Thus, such tags are a valuable tool in many areas of animal management, such as breeding, disease eradication, wildlife management, laboratory experimentation, etc.

While a wide variety of animal identification tags is known in the art, such tags have had a number of drawbacks. The majority of the tags do not stand up on the ear, and are therefore sometimes difficult to read. Also, many of the tags are two-piece construction and are therefore more difficult to attach to the ear of an animal. In addition, many such tags require expensive special tools for affixing the tag.

Another problem with prior art ear tags is that they tend to move around after installation, irritating the opening and preventing healing. Because they are generally placed in a lower portion of the animal's ear, which is generally a weak portion, they also tend to pull out in the field. This problem is aggravated by the increased likelihood that a tag affixed to a lower portion of the ear will be caught or snagged or brush or fences.

Generally, the present invention provides an improved animal identification tag for attachment to the ear of an animal which comprises a flat information-carrying portion having a surface upon which indicia may be placed and a pin or shaft extending outwardly from the edge of the information-carrying portion in a direction generally parallel to the surface. The end of the pin has laterally extending, flexible prongs which serve to retain the tag in position after the prongs have passed through the ear of an animal. In order to cause the tag to stand outwardly from the ear, the tag is provided with a pair of flexible, resilient support members which extend outwardly from the information-carrying portion adjacent to the pin. The support members are positioned to contact the surface of the ear of an animal when the prongs are passed through the ear.

The invention, its construction and method of operation, together with the objects and advantages thereof, will be best understood by reference to the following detailed description, taken in conjunction with the drawings, in which:

FIG. 1 is an elevation view of an animal identification tag embodying the present invention, indicating in phantom lines the manner in which the tag is attached to the ear of an animal;

FIG. 2 is an end view of the device shown in FIG. 1 positioned on the ear of an animal, and indicating the ear in cross-section;

FIG. 3 is a perspective view of an identification tag embodying the present invention in association with a tool for inserting the tag into the ear of an animal.

Figure 4:
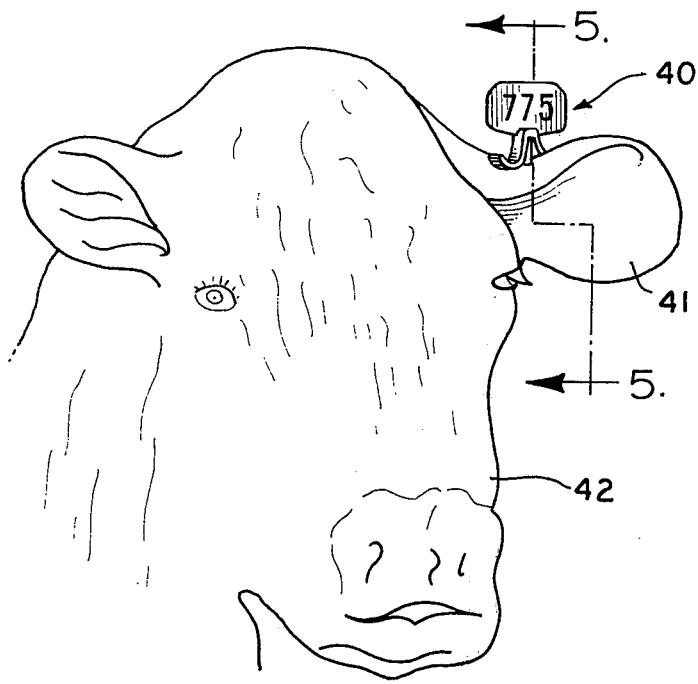
FIG. 4 is a perspective view of a second embodiment of the present invention mounted in the ear of a steer.

Referring to FIG. 1, an animal identification tag embodying the present invention is generally indicated by reference numeral 10. The tag 10 has a flat information-carrying portion 12, which may be of any desired shape. In the embodiment shown, the information-carrying portion is of generally octagonal shape. Referring to FIG. 2, it can be seen that the preferred information-carrying portion 12 is generally of a flat plate configuration, and that information can be displayed on either side of the portion 12.

Extending outwardly from the information-carrying portion 12 is a pin or shaft 14 which is seen to be generally parallel to the surface of the information-carrying portion 12. Because the pin 14 is relatively thick and has a circular cross sectional configuration, it will tend to be more rigid than the other portions of the tag 10. The pin 14 has four laterally extending, flexible prongs 16 which are inclined rearwardly toward the information-carrying portion 12, and form a generally spear-shaped tip on the pin 14. The prongs 16 are mounted in a manner that permits them to be deflected rearwardly toward the pin 14 when the prongs 16 are passed through the ear of an animal.

Adjacent to the shaft 14 are a pair of flexible, resilient support members 18, which are indicated in FIGS. 1 and 2 in their outwardly deflected position in contact with the ear 19 of an animal by reference numeral 18'. In the preferred embodiment shown, the support members 18 are of J-shaped configuration so that the rounded ends of the support members 18 can slide easily outwardly along the surface of the ear 19.

Referring to FIG. 3, the animal identification tag 10 of the present invention is shown in association with a tool, generally indicated by reference numeral 24, for inserting the tag 10 into the ear of an animal. The tool 24 is of the type described in U.S. Pat. No. 3,512,289, which is assigned to the assignee of this application. As shown in FIG. 3, the tool 24 has a handle 26 and a blade 28 extending longitudinally outwardly from the end of the handle 26. The blade 28 is of rounded cross-sectional configuration, has a sharp piercing point 30 on the tip, and has cutting edges 31 on the leading edge thereof. The blade also has a slot 32 on the underside thereof, which receives the lowermost prong 16 of the identification tag 10, and is of a sufficient length to permit the prong 16 to fold back against the pin 14 when the prong 16 passes through the ear 19 of an animal.

When the tag 10 of the present invention is inserted into the ear of an animal, the tag 10 is first positioned on the tool 24 as indicated in FIG. 3, with one of the prongs 16 extending downwardly through the slot 32. It may be necessary to employ finger pressure in order to maintain the tag 10 in position as shown in FIG. 3 while it is inserted into an animal's ear. The piercing tip of the blade is then moved through the ear of the animal, during which motion the prongs 16 will deflect inwardly and then spring outwardly after having passing through the ear. Because of the sloping leading edge of the prongs 16, the tool 24 may be quickly withdrawn from the ear of the animal, and the prongs 16 will slide out of the slot 32. As the tag 10 is inserted into the animal, the support members 18 will deflect into the position 18', as indicated by the phantom lines in FIG. 1. Because of the resiliency of the support members 18, they will exert constant pressure against the surface of the animal's ear 19. It is thus seen that the support members 18 will retain the tag 10 in an upright position relative to the surface of the ear 19.

Referring to FIG. 4, a second embodiment of the invention, generally indicated by reference numeral 40, is shown mounted in the ear 41 of a steer 42. As can be seen from the drawing, the tag 40 is highly visible from virtually any angle. Furthermore, the tag 40 is quite stable, as it is mounted in an upper portion of the ear near the root, when the cartilage is relatively heavy.

Figure 5:
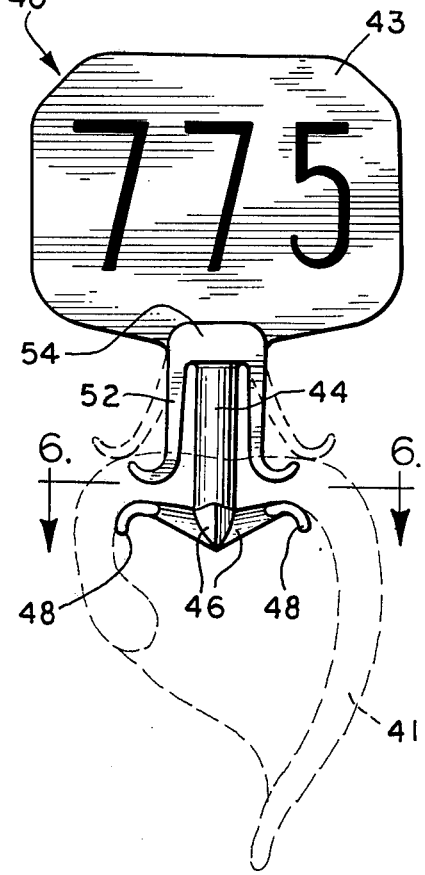
FIG. 5 is an elevation view of the device shown in FIG. 4, taken along line 5—5 thereof.
Figure 6:
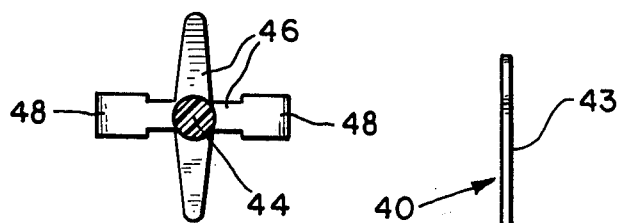
FIG. 6 is a cross-sectional view taken along line 6—6 of FIG. 5.
Figure 7:
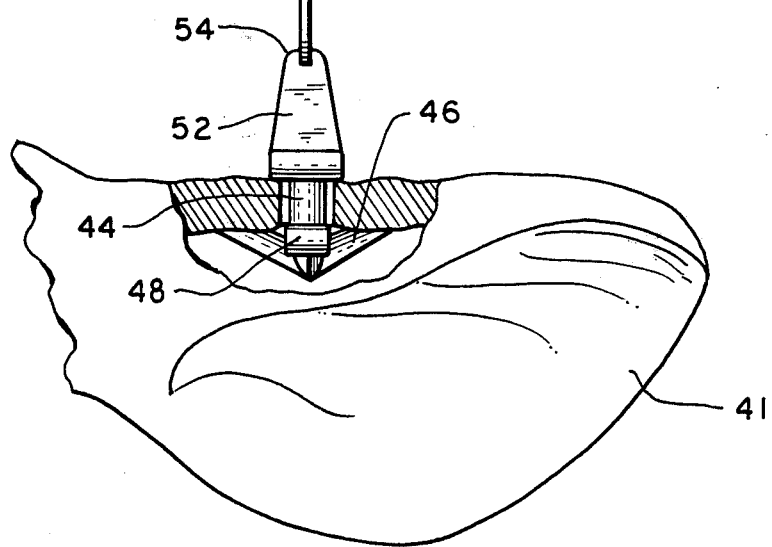
FIG. 7 is a side view of the device shown in FIGS. 4–6, partially cut away to indicate the manner in which it is inserted into the ear of an animal.

Referring to FIG. 5, like the tag 10 shown in FIGS. 1-3, the second embodiment 40 has a flat information carrying portion 43 and a pin or shaft 44 extending outwardly therefrom in a direction generally parallel to the surfaces of the information-carrying portion 43. Also like the first embodiment of the tag 10, the second embodiment has four laterally extending flexible prongs 46 extending outwardly from the end of the pin 44. Referring to FIGS. 5–7, it will be seen that two of these prongs 46, extending in a direction generally parallel to the information-carrying portion 42, have curved tip portions 48 which are curved downwardly away from the information-carrying portion 42. The prongs 46 also have relatively flat upper portions, so that the ear 41 is contacted by a flat surface to reduce irritation.

Referring to FIG. 5, it is seen these curved tip portions 48 tend to conform to the inner contour of the ear 41 of a steer or the like. This conformation substantially reduces irritation to the inner surface of the ear 41, and also aids in immobilizing the tag 40 by retarding rotation after installation thus promoting faster healing. Because these tip portions 48 are preferably made of the same flexible material as the tag 44 itself, they do not increase the difficulty of installation with the tool 24, as previously described.

Referring to FIG. 7, it will be seen that the tag 40 includes flexible J-shaped support members 52 which are tapered to be wider at their lower, curved portions than at their upper portions. This increased width at the portion where the J-shaped members 52 contact the outer surface of the ear 41 provides an increased supporting surface, and further aids in immobilizing the tag 40. The increased support provided by these tapered support members 52 also permits the use of a larger information-carrying portion 43, as the increased stability permits increased weight in this portion.

The displacement of the support members 52 when inserted into the ear 41 is shown in FIG. 5 by phantom lines. As can be seen in that figure, the tag 10 is rigidly held in place. As shown in FIGS. 5 and 7, the base of the information-carrying portion 43 preferably has a thickened portion 54 which maintains the pin 44 in a relatively rigid relationship with the information-carrying portion 43, and which also helps maintain inward pressure of the legs 52 when the tag 40 is installed on an animal.

Both of the tags 10, 40 shown in the drawings may be made out of any suitable resilient material, and are preferably of unitary construction. The most preferred materials for making the tags 10, 40 are resilient, flexible plastic such as opaque, polyurethane, polyethylene, polypropylene, and the like. In addition to being flexible, these materials should be sufficiently though to withstand hard usage. It is also desirable to make the information-carrying portion as thin as possible, consistent with adequate strength, as reduced weight will also aid in immobilizing the tags 10, 40. In addition, a thin information-carrying portion tends to be highly flexible, reducing the tendency of the tag to snag on objects.

Although the animal identification device 10 of the present invention has been described in connection with its preferred positioning on an animal, i.e., insertion through the ear, as those skilled in the art are aware, the tag may also be affixed to other portions of the animal such as the brisket, flank, or the skin at the achilles tendon. However, in most instances, it is preferred to attach the device 10 to the ear.

Obviously, many modifications and variations of the invention as hereinbefore set forth will occur to those skilled in the art, and it is intended to cover in the appended claims all such modifications and variations as fall within the true spirit and scope of the invention.

I claim:

1. An improved animal identification tag comprising: a flat information-carrying portion having a surface on which indicia may be placed; a pin extending outwardly from the edge of said information-carrying portion in a direction generally parallel to said surface; laterally extending flexible prongs on the end of said pin; and a pair of flexible, resilient support members extending outwardly from said information-carrying portion adjacent to said pin, said support members being positioned to contact the surface of the ear of an animal when said prongs are passed through said ear.

2. The animal identification tag as defined in claim 1 wherein said support members are on opposite sides of said pin.

3. The animal identification tag as defined in claim 2 wherein said support members are J-shaped.

4. The animal identification tag as defined in claim 3 wherein said tag is made of a unitary piece of resilient, flexible plastic material.

5. The animal identification tag as defined in claim 4 wherein said support members are tapered so that the curved portion thereof is wider than the opposite end adjacent said information-carrying portion.

6. A one-piece identification tag member of molded resilient plastic material for mounting on the top of the ear of an animal in a vertical attitude comprising:
   an upper identification portion adapted to be mounted in a vertical attitude above the ear of an animal,
   a shaft portion downwardly depending from said identification portion and adapted to extend through the ear,
   a retaining head portion on the lower end of said shaft portion having first upwardly facing inner ear abutting means for engaging an inner surface of the ear and supporting said head portion thereagainst,
   resilient supporting leg means downwardly depending from said identification portion for supporting said identification portion and said shaft portion relative to the ear, and
   second downwardly facing outer ear abutting surface means on the lower end of said leg means for engaging an outer surface of the ear to hold the tag member in the vertical attitude while permitting temporary resilient deflected displacement of said identification portion relative to said shaft portion.

7. The invention as defined in claim 6 and wherein: said supporting leg means comprising a pair of leg portions spaced closely adjacent said shaft portion and extending generally parallel to said shaft portion.

8. The invention as defined in claim 7 and wherein said leg portions having a generally rectangular cross-sectional configuration, and
a lower terminal portion on each of said leg portions extending laterally outwardly relative to said shaft portion, said second downwardly facing abutment surface means being located on said lower terminal portion.

9. The invention as defined in claim 6 and wherein:
said retaining head portion comprising a plurality of prong members extending laterally outwardly from said shaft portion.

10. The invention as defined in claim 9 and wherein:
said first upwardly facing inner ear abutting means comprising a first upwardly facing abutment surface on each prong member laterally outwardly spaced from said shaft portion, and
a second upwardly facing surface on each prong member between said first upwardly facing abutment surface and said shaft portion, said second upwardly facing surface being downwardly offset from said first upwardly facing abutment surface.

11. The invention as defined in claim 10 and wherein:
said second upwardly facing surface being inclined downwardly from said first upwardly facing abutment surface to said shaft portion.

12. The invention as defined in claim 11 wherein said prong members are resiliently deflectable downwardly during abutment contact between said first upwardly facing abutment surface and the inner ear surface.

13. The invention as defined in claim 12 wherein said second upwardly facing surface being downwardly spaced from the inner ear surface during abutting contact between said first upwardly facing abutment surface and the inner ear surface so as to provide a gap therebetween.

14. The invention as defined in claim 13 wherein said prong members having upwardly inclined downwardly facing lower edges, said prong members being resiliently upwardly deflectable to enable mounting of the tag through the ear.

15. The invention as defined in claim 14 wherein the lower surfaces of said prong members terminate in a sharp point.

16. An animal identification tag adapted to be mounted in a vertical upstanding position on an ear of an animal, the ear comprising a frontal downwardly extending lobe portion, a rear lobe portion, and an upper interconnecting portion having upper and lower surfaces, said tag comprising:
an identification portion adapted to be mounted in vertically spaced relationship above the upper surface of the upper interconnecting portion of the ear,
a vertically extending shaft portion connected at the upper end to said identification portion and adapted to extend downwardly through the upper interconnecting portion of the ear and beyond the lower surface of the ear,
inner ear surface abutting means on the lower end of said shaft portion providing an upwardly facing abutment surface for abutting engagement with the lower inner surface of the ear to hold the tag in the vertical attitude on the ear,
outer ear surface abutting means associated with said identification portion and said shaft portion providing a downwardly facing abutting surface for abuttingly engaging the upper outer surface of the ear,
said inner ear surface abutting means and said outer ear surface abutting means and said shaft portion being spaced and arranged for cooperatively holding said identification portion in a vertically upright position above the ear, and
resilient connecting means between said identification portion and said shaft portion of permitting resilient flexible displacement of said identification portion relative to said inner ear surface abutting means from the vertically upright position to various laterally displaced positions under application of externally applied forces and for permitting resilient flexible displacement of said identification portion from the various laterally displaced positions to the vertically upright position upon removal of the externally applied forces.

17. The invention as defined in claim 16 wherein said outer ear abutting means comprising:
resilient supporting leg means downwardly depending from said identification portion with said downwardly facing abutment surface located on the lower end of said leg means for resiliently supportively holding said downwardly facing abutment surface on the outer surface of the ear.

18. The invention as defined in claim 17 and wherein:
said supporting leg means comprising a pair of leg portions spaced closely adjacent said shaft portion and extending generally parallel to said shaft portion.

19. The invention as defined in claim 18 and wherein:
said leg portions having a lower terminal portion extending laterally outwardly relative to said shaft portion, and
said downwardly facing abutment surface being located on said lower terminal portion and extending laterally outwardly relative to said shaft portion.

20. The invention as defined in claim 17 and further comprising:
a retaining head portion on the lower end of said shaft portion,
said retaining head portion being of larger cross-sectional area than said shaft portion, and
said inner ear surface abutting means being located on said head portion.

21. The invention as defined in claim 20 and wherein:
said retaining head portion comprising a plurality of prong members extending laterally outwardly from said shaft portion.

22. The invention as defined in claim 21 and wherein said head portion further comprising:
a first upwardly facing inner ear abutment surface on each prong member laterally outwardly spaced from said shaft portion, and
a second upwardly facing surface on each prong member between said first upwardly facing abutment surface and said shaft portion, said second upwardly facing surface being downwardly offset from said first upwardly facing abutment surface.

23. The invention as defined in claim 22 and wherein:
said second upwardly facing surface being inclined downwardly from said first upwardly facing abutment surface to said shaft portion.

24. The invention as defined in claim 23 wherein said prong members being resiliently deflectable downwardly for providing full abutting contact between said first upwardly facing abutment surface and the inner ear surface.

25. The invention as defined in claim 24 wherein said second upwardly facing surface being downwardly spaced from said first upwardly facing abutment surface a sufficient distance so as to provide a gap between the inner ear surface and said second upwardly facing surface.

26. The invention as defined in claim 25 wherein said prong members having upwardly inclined downwardly facing lower edges, said prong members being resiliently upwardly deflectable for mounting of the tag through the ear.

27. An animal identification tag adapted to be mounted in a vertical upstanding position on an ear of an animal, said tag comprising:
an identification portion adapted to be mounted in vertically spaced relationship above the upper surface of the upper interconnecting portion of the ear,
a vertically extending shaft portion connected at the upper end to said identification portion and adapted to extend downwardly through the ear and beyond the lower surface of the ear,
inner ear surface abutting means on the lower end of said shaft portion providing an upwardly facing abutment surface for abutting engagement with the lower inner surface of the ear to hold the tag in the vertical attitude on the ear,
outer ear surface abutting means associated with said identification portion and said shaft portion providing a downwardly facing abutting surface for abuttingly engaging the upper outer surface of the ear,
said inner ear surface abutting means and said outer ear surface abutting means and said shaft portion being spaced and arranged for cooperatively holding said identification portion in a vertically upright position above the ear, and
resilient connecting means between said identification portion and said shaft portion for permitting resilient flexible displacement of said identification portion relative to said inner ear surface abutting means from the vertically upright position to various laterally displaced positions under application of externally applied forces and for permitting resilient flexible displacement of said identification portion from the various laterally displaced positions to the vertically upright position upon removal of the externally applied forces.

28. The invention as defined in claim 27 wherein said outer ear abutting means comprising:
resilient supporting leg means downwardly depending from said identification portion with said downwardly facing abutment surface located on the lower end of said leg means for resiliently supportively holding said downwardly facing abutment surface on the outer surface of the ear.

29. The invention as defined in claim 28 and wherein:
said supporting leg means comprising a pair of leg portions spaced closely adjacent said shaft portion and extending generally parallel to said shaft portion.

30. The invention as defined in claim 29 and wherein:
said leg portions having a lower terminal portion extending laterally outwardly relative to said shaft portion, and
said downwardly facing abutment surface being located on said lower terminal portion and extending laterally outwardly relative to said shaft portion.

31. The invention as defined in claim 28 and further comprising:
a retaining head portion on the lower end of said shaft portion,
said retaining head portion being of larger cross-sectional area than said shaft portion, and
said inner ear surface abutting means being located on said head portion.

32. The invention as defined in claim 31 and wherein:
said retaining head portion comprising a plurality of prong members extending laterally outwardly from said shaft portion.

33. The invention as defined in claim 32 and wherein said head portion further comprising:
a first upwardly facing inner ear abutment surface on each prong member laterally outwardly spaced from said shaft portion, and
a second upwardly facing surface on each prong member between said first upwardly facing abutment surface and said shaft portion, said second upwardly facing surface being downwardly offset from said first upwardly facing abutment surface.

34. The invention as defined in claim 33 and wherein:
said second upwardly facing surface being inclined downwardly from said first upwardly facing abutment surface to said shaft portion.

35. The invention as defined in clam 34 wherein said prong members being resiliently deflectable downwardly for providing full abutting contact between said first upwardly facing abutment surface and the inner ear surface.

36. The invention as defined in claim 35 wherein said second upwardly facing surface being downwardly spaced from said first upwardly facing abutment surface a sufficient distance so as to provide a gap between the inner ear surface and said second upwardly facing surface.

37. The invention as defined in claim 36 wherein said prong members having upwardly inclined downwardly facing lower edges, said prong members being resiliently upwardly deflectable for mounting of the tag through the ear.

* * * * *

UNITED STATES PATENT AND TRADEMARK OFFICE
CERTIFICATE OF CORRECTION

PATENT NO. : 4,010,563
DATED : March 8, 1977
INVENTOR(S) : Jackson T. Schwindt

It is certified that error appears in the above-identified patent and that said Letters Patent are hereby corrected as shown below:

Column 1, line 3, "copening" should read --copending--

Column 1, line 33, "or" second occurrence should read --on--.

Column 2, line 10, after "embodiment shown," delete "in"

Column 2, line 63, "passing" should read --passed--

Column 3, line 67, "though" should read --tough--

Column 5, line 31, "abutment" should read -abutting--

Column 6, line 9, "of" should read --for--

Column 8, line 41, "clam" should read --claim--

Signed and Sealed this

Seventh Day of June 1977

[SEAL]

Attest:

RUTH C. MASON
*Attesting Officer*

C. MARSHALL DANN
*Commissioner of Patents and Trademarks*